N. VUKASOVICH.
GUIDING ATTACHMENT FOR SEINES.
APPLICATION FILED FEB. 7, 1912.
1,078,566.
Patented Nov. 11, 1913.
2 SHEETS—SHEET 1.
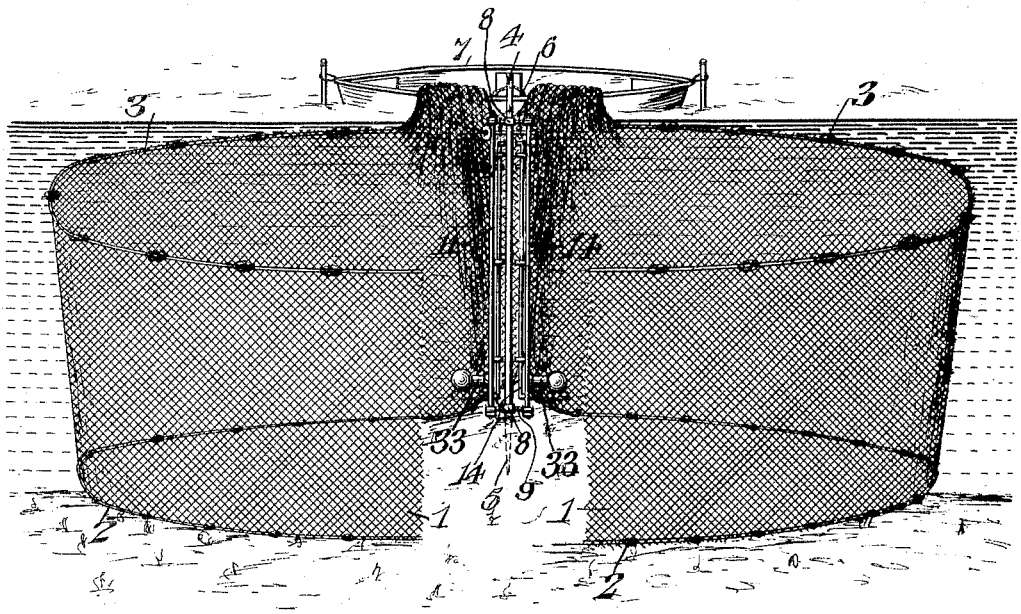
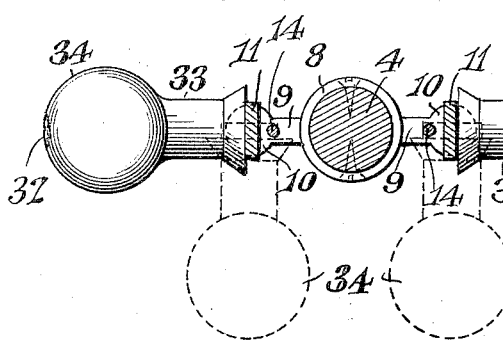
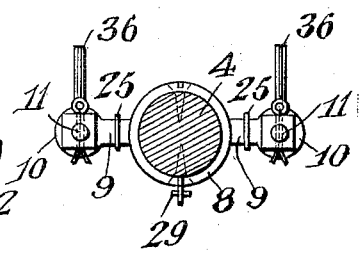
WITNESSES
Jas. K. McCathran
H. T. Chapman
Nicklio Vukasovich INVENTOR
BY
E. G. Siggers
ATTORNEY N. VUKASOVICH.
GUIDING ATTACHMENT FOR SEINES.
APPLICATION FILED FEB. 7, 1912.
1,078,566.
Patented Nov. 11, 1913.
2 SHEETS—SHEET 2.
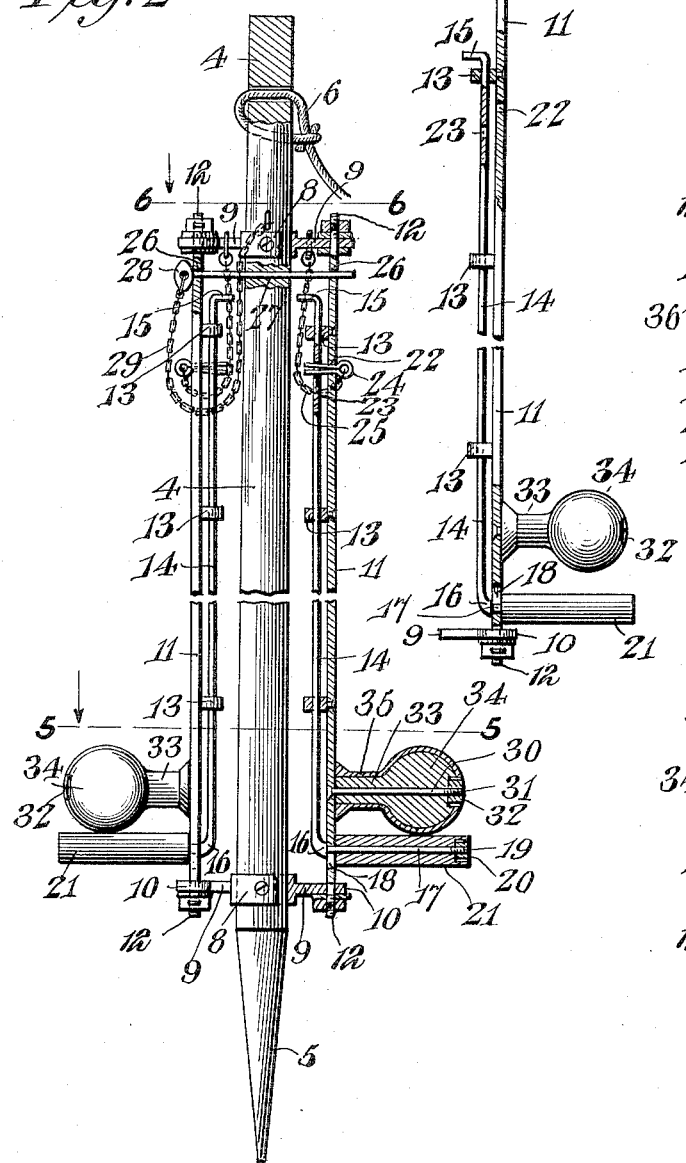
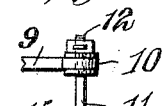
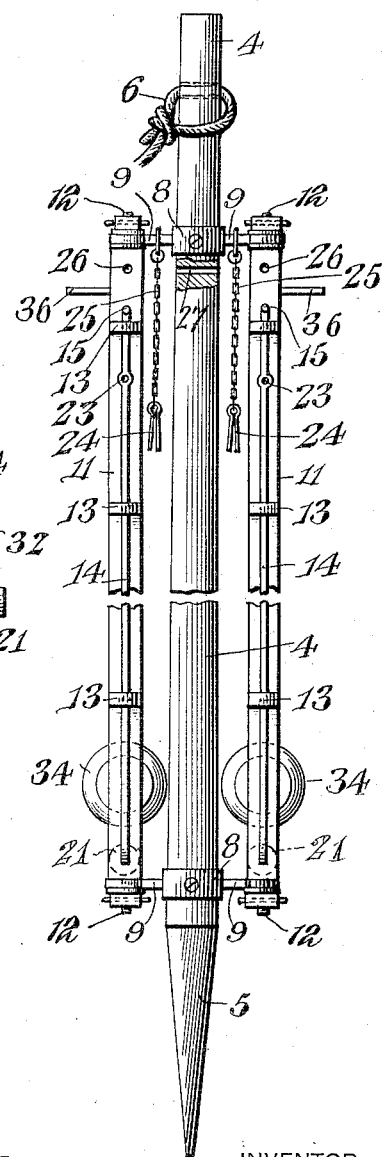
WITNESSES
Jas. K. McCathran
F. T. Chapman.
INVENTOR
Nicklio Vukasovich,
BY
C. G. Siggers
ATTORNEY

UNITED STATES PATENT OFFICE.

NICKLIO VUKASOVICH, OF NEW ORLEANS, LOUISIANA.

GUIDING ATTACHMENT FOR SEINES.

1,078,566.  Specification of Letters Patent.  Patented Nov. 11, 1913.

Application filed February 7, 1912. Serial No. 676,117.

*To all whom it may concern:*

Be it known that I, NICKLIO VUKASOVICH, a citizen of the United States, residing at New Orleans, in the parish of Orleans and State of Louisiana, have invented a new and useful Guiding Attachment for Seines, of which the following is a specification.

This invention has reference to improvements in attachments for hauling seines, whereby the lead line of the seine may be maintained at or close to the bottom while the seine is being hauled.

In accordance with the present invention there is provided a stem or pole having pairs of rollers near what constitutes the lower end of the pole when in use, one of each pair of rollers being shiftable toward and from the other and one of each pair of rollers being so shaped that leads of the lead line may pass between the rollers, while the netting of the seine is engaged by the contacting or closely approaching portions of the rollers. The rollers may be adjusted in other ways than simply one toward the other to facilitate the formation of the seine into a bag by the indrawing of the lead line portion of the seine, such formation of the seine fascilitating the gathering in of the catch.

The invention will be best understood from a consideration of the following detailed description, taken in connection with the accompanying drawings forming a part of this specification, but it will also be understood that while the drawings show a practical form of the invention the latter is susceptible of various changes and modifications so that the invention is not confined to any strict conformity with the showing of the drawings, but may be variously changed so long as the salient features of the invention are retained.

In the drawings:—Figure 1 is a perspective view illustrative of the use of the invention. Fig. 2 is an elevation with parts in section of the attachment forming the subject-matter of the present invention. Fig. 3 is a view similar to Fig. 2 showing a different position of the parts. Fig. 4 is a detailed elevation of one of the pairs of rollers and supporting means therefor. Fig. 5 is a section on the line 5—5 of Fig. 2. Fig. 6 is a section on the line 6—6 of Fig. 2 with distant parts omitted.

Referring to the drawings, there is shown in Fig. 1 a seine 1 provided with a lead line 2 and a float line 3, all of which may be of customary construction.

It is usual to fasten one end of the seine to a stake driven in the bottom of the body of water wherefrom the fish are to be gathered, and then the remainder of the seine is dropped from a traveling boat in a large circle or detour back to the stake, or to a second stake close by, the seine standing approximately upright because of the float line and lead line, the latter resting on the bottom with the floats at or near the surface, thereby preventing the escape of fish inclosed by the seine.

In hauling in the seine there is a liability of lifting the lead line so that many fish may escape by swimming under the lead line.

To prevent the lifting of the lead line while the bottom of the seine is being contracted until ultimately the lead line is brought practically together and the greater portion of it loaded on the boat, there is provided a device forming the subject-matter of the present invention. The device comprises a stake or pole 4 having one end 5 sharpened or pointed so that the stake or pole may be readily driven into the bottom of the body of water to such a depth as to hold the device against accidental lifting. The pole 4 is of sufficient length to reach the bottom of the body of water while still at the other end accessible above the surface of the water. The end of the pole 4 remote from the end 5 may be provided with means for the attachment of a rope 6 to be secured to a boat, such as indicated at 7 in Fig. 1. Near the two ends of the pole there are secured collars 8—8, respectively, from which project in opposite directions arms 9 ending in eyes 10. Extending between the eyes 10 on each side of the pole is a bar 11 which may be a simple flat bar with ends 12 reduced and adapted to the eyes 10, so that the latter constitute journal bearings for the bar 11, there being two such bars on opposite sides of the pole. Each bar 11 carries a number of guide blocks 13 for a rod 14 capable of a limited longitudinal movement through the eyes 13, one end of the bar being turned at an angle to form a handle 15 and the other end of the bar being turned at an angle, as indicated at 16, and there carrying a pintle 17 extending through an elongated slot 18 formed in the respective bar 11 near what constitutes its lower end when in operative position. The outer end of the pintle 17 may be threaded, as indicated at 19, for the reception of a nut 20 and the pintle carries a roller 21 held thereon by the nut 20, but in such manner that the roller 21 may freely rotate on the pintle. The rod 14 is slidable in the direction of its length in the blocks 13, the extent of such sliding movement being determined by the length of the slot 18, and the bar 11 and rod 14 are formed with passages 22, 23, respectively, which when the pintle 17 is at or near the upper end of the slot 18, coincide and the rod and bar may then be locked together by a pin 24 introduced through the then matching perforations, said pin being customarily secured to the device by a chain 25 or other suitable means preventing loss of the pin 24. While the construction of the pin 24 may vary, a cotter pin, as indicated in the drawings, is found to be a very convenient form of pin which will automatically lock in position without too much resistance to the designed removal of the pin, but other means may be employed for the purpose, therefore the pin 24 may be taken as typical of any readily removable fastening means whereby the bar 11 and rod 14 are held in immovable relation when such conditions are desirable.

Under certain conditions it is desirable that the bars 11 be held against rotation in their bearings, for which reason each bar 11 near its upper end is provided with a perforation or passage 26 and the post 4 has a matching passage 27, so that by means of a pin 28 traversing the passages 26 and 27 the two bars 11 may be held in substantially immovable relation to the post 4, and to prevent the pin 28 from being lost it may be secured by a chain 29 to any desirable part of the structure, the chain being of sufficient length to permit the manipulation of the pin.

Considering the device as standing upright, each bar 11 carries at a point above the roller 21 a pintle 30 threaded at its outer end 31 for the reception of a nut 32 and mounted on the pintle for rotation is a roller 33 having an approximately spherical outer end 34, while the surface of the roller is provided with a metal envelop 35, brass answering for the purpose, since it is sufficiently resistant to the action of water. The rollers 21 and 33 are so related that their pintles 17 and 30 are approximately parallel, the roller 21 with its pintle being movable toward and from the roller 33 until the surface of the roller 21 is in engagement with or in close relation to the enlarged or spherical end 34 of the roller 33, or more properly with respect to the shell inclosing the roller 33, but as the shell forms a part of the roller it will be assumed to be included whenever the roller 33 is mentioned. The ends of the bars 11 constituting their upper ends when in operative position are provided with outstanding fingers 36, by means of which these bars may be turned on their longitudinal axes.

After the desired area has been encircled by the seine, the lead line at the meeting ends of the seine is lifted to the surface if not already there, and the respective ends of the lead line are laid upon the rollers 21, after which these rollers are moved by a manipulation of the rods 14 until they are in approximate engagement with the spherical ends of the rollers 33, the space defined between these spherical ends and the respective bars 11 and in part inclosed by the rollers 21 admitting of the passage of the leads on the lead line, as well as the line itself. The pole 4 with the lead line locked between the rollers is then lowered into the water until the pointed end 5 of the pole reaches the bottom and the pole is forced into the bottom until the rollers 21 are approximately on the bottom, the rods 14 having been locked to the bars 11 by the introduction of the pins 24 after the rollers of each pair have been brought together. The boat line 6 is made fast to the middle of the boat 7. Now the pin or key 28 is inserted and then the seine may be drawn straight toward the boat until the seine bag is close to the boat, after which the pin or key 28 may be removed and the pins 24 are also removed and the seine lead line will come out from between the rollers 21 and 33, especially when the pairs of rollers have been moved into approximately-parallel relation by the turning of the bars 11 no longer held by the pin 28 when on a further pulling of the seine into the boat the bag is brought alongside of the boat with the catch inclosed therein against possibility of escape.

While the rollers 21 and 33 are shown as a plain cylindrical roller and a spherical roller with a thin neck portion, respectively, it will be understood that other shaped rollers may be substituted therein so long as provision is made for locking the lead line against accidental displacement in a manner similar to the rollers 21 and 33.

What is claimed is:—

1. In a device for the purpose described, a stake or pole, a pair of rollers, a support for the rollers extending from near one end of the pole to the other end thereof, said support being carried by the pole and movable on an axis parallel with the longitudinal axis of the pole, the pair of rollers being carried by the support near one end thereof, one of the rollers being in relatively fixed relation to the support and the other movable toward and from the first named roller in the direction of the length of the support, and means carried by the support and accessible at the end of the pole remote from the support for adjusting the movable roller.

2. In a device for the purpose described, a stake or pole, pairs of rollers on opposite sides of the stake or pole, one roller of each pair being movable relative to the other in the direction of the length of the pole, supporting means for each pair of rollers carried by the pole on a respective side thereof and movable on an axis substantially parallel with the longitudinal axis of the pole, each support extending from a point adjacent one end of the pole to a point adjacent the other end thereof and carrying the rollers near one end, and means for each movable roller of a pair of rollers also carried by the support and accessible at the end of the support remote from that carrying the rollers for adjusting the roller of the pair to which the said means is individual.

3. A device for the purpose described comprising a stake or pole, supporting members near the ends thereof, rockable bars carried by the supporting members and movable about axes substantially parallel with the longitudinal axis of the stake or pole, a roller carried by each bar near one end thereof, a rod carried by each bar and capable of moving longitudinally thereof, a roller carried by each rod in substantially parallel relation to a companion one of the first named rollers, means for locking the rods to the bars when the rollers are in close relation one to the other, and means for locking the bars to the pole to hold the rollers in outstanding relation to the pole with their axes in substantially a diametric plane of the pole.

In testimony, that I claim the foregoing as my own, I have hereto affixed my signature in the presence of two witnesses.

NICKLIO VUKASOVICH.

Witnesses:
A. B. KOKERNOT,
M. H. HOFFMAN.

---

Copies of this patent may be obtained for five cents each, by addressing the "Commissioner of Patents, Washington, D. C."